Figure 1:
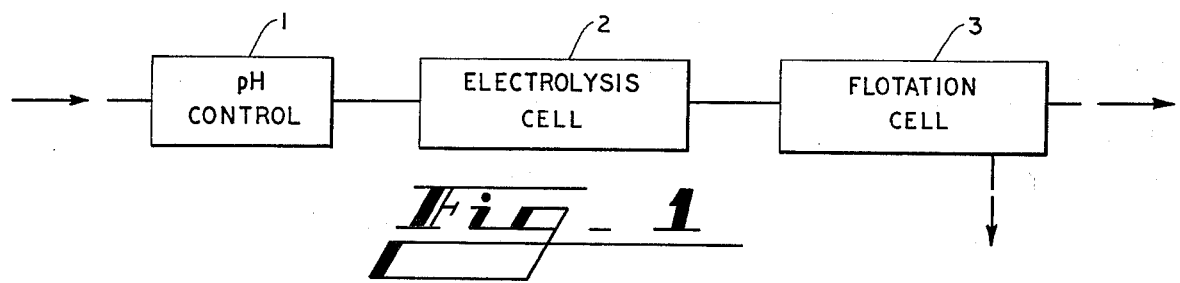

United States Patent
Sullins

[11] 3,964,991
[45] June 22, 1976

[54] METHOD AND APPARATUS FOR PRECIPITATING COLLOIDS FROM AQUEOUS SUSPENSIONS

[75] Inventor: John K. Sullins, Kingsport, Tenn.

[73] Assignee: Canton Textile Mills, Inc., Canton, Ga.

[22] Filed: July 28, 1975

[21] Appl. No.: 599,878

[52] U.S. Cl. .............................. 204/275; 204/149; 204/272; 204/273; 204/274
[51] Int. Cl.² ..................... C25B 9/00; C25B 11/02
[58] Field of Search ........... 204/149, 152, 275, 272, 204/273, 232, 274; 210/42, 44, 45

[56] References Cited
UNITED STATES PATENTS

| | | | |
|---|---|---|---|
| 823,671 | 6/1906 | Dieterich | 204/275 X |
| 1,157,233 | 10/1915 | Lashmet | 204/149 X |
| 1,219,333 | 3/1917 | Kynaston | 204/152 |
| 2,687,996 | 8/1954 | Butler | 204/275 X |
| 3,092,566 | 6/1963 | Negus | 204/152 X |
| 3,347,786 | 10/1967 | Baer et al. | 204/149 X |
| 3,728,244 | 4/1973 | Cooley | 204/275 X |

Primary Examiner—John H. Mack
Assistant Examiner—A. C. Prescott
Attorney, Agent, or Firm—Walter M. Rodgers; Walter A. Rodgers

[57] ABSTRACT

Colloids are precipitated from an aqueous suspension by electrolysis techniques in which a flocculation cell is provided with a soluble anode formed preferably of multi-valent material and wherein the cathode comprises a metal cylinder having an inlet at one end and an outlet at the other end and in which the anode is coaxially disposed in insulated relation to the cathode so that an aqueous suspension may be caused to flow through the cell in such manner as thoroughly and systematically to wash the inner surface of the cathode and the outer surface of the anode by following a generally helical path which inhibits formation of large clusters of hydrogen and oxygen gas established by the application of an electric potential across the cathode and anode. The pH of the aqueous solution must be controlled at a substantially neutral value and the anode preferably is formed of soluble aluminum, iron, magnesium or other multi-valent metal.

5 Claims, 6 Drawing Figures

U.S. Patent  June 22, 1976  3,964,991

METHOD AND APPARATUS FOR PRECIPITATING COLLOIDS FROM AQUEOUS SUSPENSIONS

This invention embodies basic principles which are of general application and are not limited to use in conjunction with any particular particle size. On the other hand the particular form of the invention as shown and described and other forms within the contemplation of this invention are particularly applicable to the precipitation of colloids. Examples of colloids are sulfur base and indigo dyes used in dyeing of fabrics such as textiles and the like.

Colloids may be defined as those particles whose diameter falls within a range from 0.001 micron to 1.0 micron. Colloids are larger in diameter than particles which form so-called true solutions and are smaller than particles which are generally characterized as ordinary matter.

Conventional treatment systems can effectively deal with organic carbon in a true solution and in ordinary matter forms. An aerobic biological system is known in which compounds which may be classified as true solutions may be effectively treated. Physical settling by known techniques can be employed to remove ordinary matter. Conventional treatment techniques are not generally effective when used in conjunction with colloids. Colloids are further characterized by the fact that they are larger than most inorganic molecules and by the fact that they may either be negatively or positively charged and remain in suspension indefinitely. Due to the relatively large surface area of colloid particles there is a tendency to adsorb ions and other materials which tendency leads to the formation of electric charges about the particles which function in conjunction with like charges on adjacent particles to prevent coagulation or flocculation of the particles thus insuring a stable solution in which the particles remain suspended indefinitely.

In order effectively to cause flocculation of suspended colloidal particles, it is necessary to neutralize the electric charges on the particles and simultaneously to establish miniscule gaseous bubbles which attach themselves to the neutralized particles so as efficiently to effect flotation of the particles to the surface from whence they may readily be skimmed off by known techniques. Such action according to this invention utilizes principles of electrolysis and such principles may be effectively employed only if the colloidal suspension which is to be precipitated is substantially neutral with a pH of approximately 7. Normally neutralization of the charged particles according to the invention is by way of multi-valent cations and according to one aspect of the invention apparatus is provided which causes effluent from which colloids are to be precipitated to be moved along a path which is generally spiral and which imparts a churning and efficient scrubbing action to the surfaces of the cathode and anode. This action is achieved by constructing the cathode in hollow cylindrical form and by constructing the anode of a multi-valent metal in solid cylindrical form and by mounting the anode inside of the cylindrical cathode in such manner as to define a path between the cathode and anode which is spiral since effluent enters one end of the cathode cylinder and is exhausted from the other end by inlet and outlets which are tangentially disposed relative to the cylindrical cathode thereby to establish a generally elliptical path of movement of the suspension as it passes through the flocculation cell. This controlled movement along the eliptical path inhibits the accumulation of hydrogen and oxygen on the cathode and anode respectively into large particles. By keeping the particles small, the attachment of such small particles to the colloidal particles is facilitated thereby to aid flotation of the particles which due to action of multi-valent cations derived from the anode are in clusters and are therefore by this means floated to the surface and skimmed away by conventional means in a flotation cell. While the cathode ordinarily is constructed of metal, in some instances it may be desirable to construct the cathode of graphite and a multi-valent chloride may be added to the liquid to increase conductivity.

Figure 2:
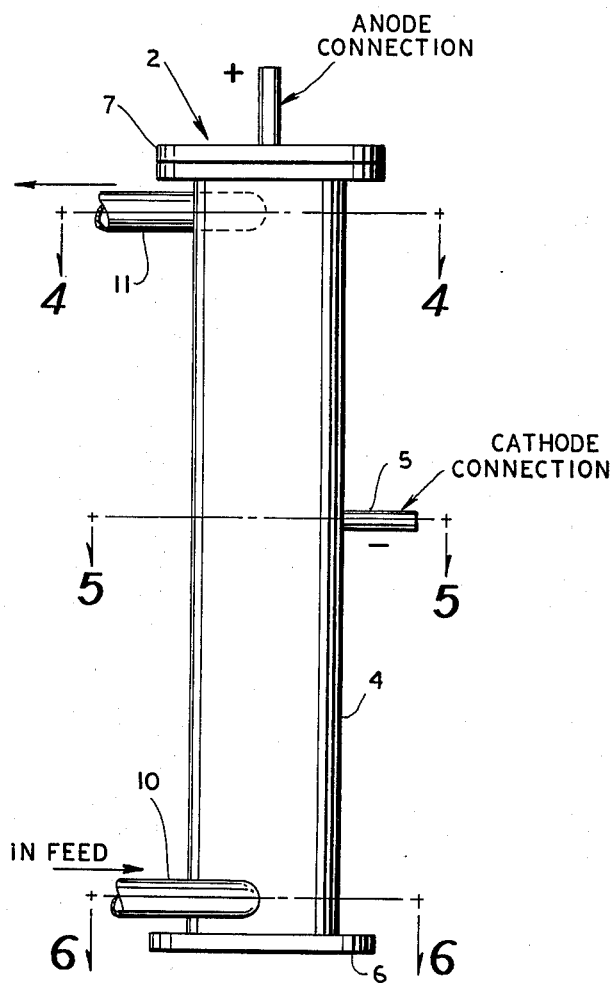
Figure 3:
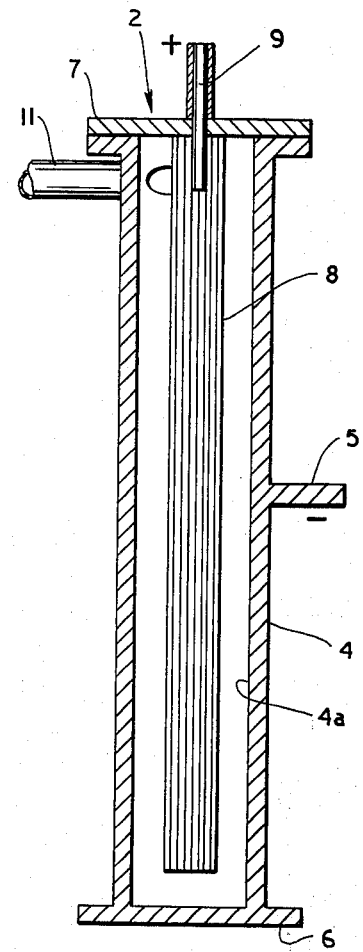
Figure 4:
Figure 5:
Figure 6:

For a better understanding of the invention, reference may be had to the following detailed description taken in conjunction with the accompanying drawings in which FIG. 1 is a schematically represented system by which the pH of an effluent is controlled prior to entering an electrolysis cell from which the effluent is passed to a flotation cell where gases produced in the electrolysis cell may effect flotation action on the electrically neutralized ion particles to be precipitated; FIG. 2 is a side view of an electrolysis cell formed according to the invention; FIG. 3 is a vertical cross section of the arrangement shown in FIG. 2; FIG. 4 is a horizontal cross-sectional view taken along the line designated 4—4 in FIG. 2; FIG. 5 is a horizontal cross sectional view taken along the line designated 5—5 in FIG. 2 and in which FIG. 6 is a horizontal cross-sectional view taken along the line designated 6—6 in FIG. 2, the base plate being omitted from the sectional views.

In FIG. 1 the station designated by the numeral 1 and marked "pH control" is simply a cell through which the effluent passes and in which certain acids or alkalies are added in order to establish the pH of the material at a desired level which for most applications of the invention is approximately 7. Of course this operation can be performed in any suitable manner by known techniques.

The effluent material from cell 1 enters the electrolysis cell designated by the numeral 2 in which the charge on the colloid particles is neutralized by electrolysis processes and in which hydrogen and oxygen are developed as a result of the electrolysis action on the aqueous suspension. Once the electrolysis action is complete, the material is passed into a conventional flotation cell 3 where the action of gases such as hydrogen and oxygen effect flotation to the surface of precipitate which then can simply be scanned off of the surface by known means.

The electrolysis cell 2 is shown in FIGS. 2-6 inclusive and comprises a metal enclosure designated by the numeral 4 which preferably takes the form of a cylinder and which is formed preferably of any suitable metal such for example as iron or steel or in some instances of graphite. The enclosure 4 is the cathode and thus is interconnected to a source of negative electric potential by means of the terminal stud 5. The lower end of cylinder 4 is closed by means of a metal base plate 6 and the upper end of cylinder 4 is closed by means of an insulating plate 7. Insulating plate 7 serves electrically to isolate the cathode 4 from the anode 8 which is supported by insulating disc 7 and to which electric terminal 9 is secured. Of course terminal 9 is connected to the positive terminal of a source of electric potential. Anode 8 preferably is formed of soluble aluminum although the anode may be formed of iron, magnesium, or other metals which preferably are multi-valent.

In order to insure a complete churning of the effluent while inside the cathode enclosure 4 and also to effect a thorough washing and cleansing action with respect to the inner surface of cathode 4 and the outer surface of anode 8, the effluent is brought into the enclosure 4 by means of an inlet designated by the numeral 10 and exhausted at outlet 11. As is apparent in FIG. 6, inlet 10 is generally tangentially disposed with respect to the inner surface 4a of the cathode cylinder 4. Similarly the outlet 11 is substantially tangentially disposed with respect to the inner surface 4a of the cathode enclosure 4 as is apparent in FIG. 4. From the above description it is apparent that effluent entering inlet 10 passes in a generally helical or spiral path upwardly in the space between cathode cylinder 4 and anode cylinder 8 to be exhausted through the outlet 11. This spiral action inhibits the formation of large bubbles of hydrogen on the inner surface of cathode enclosure 4 and similar large bubbles of oxygen on the outer surface of anode 8. If such large bubbles were allowed to form, they would quickly float to the surface without first attaching themselves to particulate matter in the form of colloids which are in suspension as the effluent enters through inlet 10.

As is apparent the arrangement shown in FIGS. 2–6 of the drawings performs an electrolysis function and ionizes the effluent as it passes along its upward spiral path about the anode 8 and inside the cathode 4. Preferably anode 8 is formed of soluble aluminum from whence multi-valent cations are obtained which effectively neutralize negative charges accumulated by the colloidal particles. Oxygen and hydrogen formed on the outer surface of the anode 8 and on the inner surface of cathode 4 respectively are swept along and the formation of large bubbles is thus prevented. Of course, large bubbles would rise to the surface quickly and would not perform an effective flotation operation after the liquid is discharged through outlet 11 and into flotation cell 3. The oxygen and hydrogen do not recombine to form water since such a reaction is exoergic. Nascent gases which are formed are quite reactive and can assist in further treatment of the effluent. That portion of the effluent which can be easily oxidized may react with nascent or molecular oxygen. Those wastes which can be hydrogenated to an insoluble form may also react to produce a material which can be separated from the effluent. Low density of hydrogen affords a very efficient flotation action. Floating characteristics are achieved at low pressure within the cell 2 and such low pressure results in low power costs.

Release of the multi-valent cation in ionic form adds no soluble solids to the effluent which enhances the quality characteristics in instances in which recycling of the water is desired. No pH change occurs which is desirable since substantially neutral pH is necessary for effective operation of the invention.

The upwardly spiraling movement of the liquid flowing through the cell 2 which sweeps the electrodes clean of gases also prevents deposition of metallic substances on the cathode. Furthermore an intimate reaction with the cations to effect removal from the soluble anode is facilitated and the spiral turbulent motion assists in effecting more efficient solubilizing of gases in the liquid and prevents coalescing of gas bubbles into larger particle size and undesired bubble form.

The cell can be operated at varying pressures. Generally relatively low pressures can be employed and efficient flotation results achieved. If circumstances require, pressure may be increased to effect a more efficient flotation and reaction of the hydrogen and oxygen.

For some applications of the invention it may be desirable for economic or other reasons to use an electrolyte such as aluminum sulphate to serve not only as a source of aluminum but also to effect a desired shift in pH in cases where an effluent has a pH greater than 7.5 for example and the effect of the addition of aluminum sulphate would be to reduce the pH to approximately 7.0.

Of course if the pH is too low this may be adjusted by means of an alkaline salt such as sodium aluminate, caustic, lime or other alkaline electrolyte.

For a particular application of this invention in which indigo dye is removed from the effluent, a rate of flow of liquid through the cell of 4 feet per second relative to the surfaces of the anode and cathode has been found to perform a satisfactory scrubbing action. In this installation, a voltage between the anode and cathode of 15 volts has been found to be satisfactory and a flow of current of 10 amperes per square foot of anode area is acceptable. Of course different applications of the invention would require different specific flow rates, voltages and currents and this invention is not limited to any specific quantitative parameter. For a particular application of the invention, a voltage which is too low tends to effect plating action which is undesirable. On the other hand, a voltage which is too high tends to produce an excessive amount of oxygen which tends to oxidize the anode and inhibits the production of desirable ions. In like fashion a certain amount of time is required for the desired electrolysis action to take place. Thus if the velocity of flow of liquid through the cell is too great, there will be insufficient time for the desired action to take place. Similarly if the rate of flow of the liquid is too slow, an accumulation of gases becomes excessive and such accumulation tends to oxidize the anode and of course is undesirable.

The embodiments of the invention in which an exclusive property or privilege is claimed are defined as follows:

1. A flocculation cell comprising a cylindrical enclosure formed of electrically conductive material, an elongated generally cylindrical electrode of electrically conductive material disposed within said enclosure in insulated relation thereto and arranged with its major axis in substantially coincidental relation with the major axis of said cylindrical enclosure to define an annular passage therebetween, an inlet formed in the cylindrical wall of said enclosure at one end thereof and generally tangentially disposed relative to the inner surface of said wall and arranged to impart swirling motion in said annular passage to liquid supplied to said enclosure through said inlet, an outlet formed in the cylindrical wall of said enclosure at the other end thereof and generally tangentially disposed relative to the inner surface of said wall and arranged to exhaust liquid from said annular passage tangentially thereof and in the same general direction as the direction of swirling movement thereof so as to facilitate flow of liquid in a generally helical path through said annular passage, and means for impressing an electric potential between said enclosure and said electrodes.

2. A cell according to claim 1 wherein said electrode is water soluble.

3. A cell according to claim 1 wherein said electrode is of multi-valent metal.

4. A cell according to claim 1 wherein said electrode is formed of carbon.

5. A cell according to claim 1 wherein said electrode is formed of aluminum.

* * * * *